March 22, 1960     N. B. CHRISTENSEN     2,929,407
CONTROL DEVICE FOR VEHICLE SUSPENSION
Filed Feb. 13, 1956     2 Sheets-Sheet 1
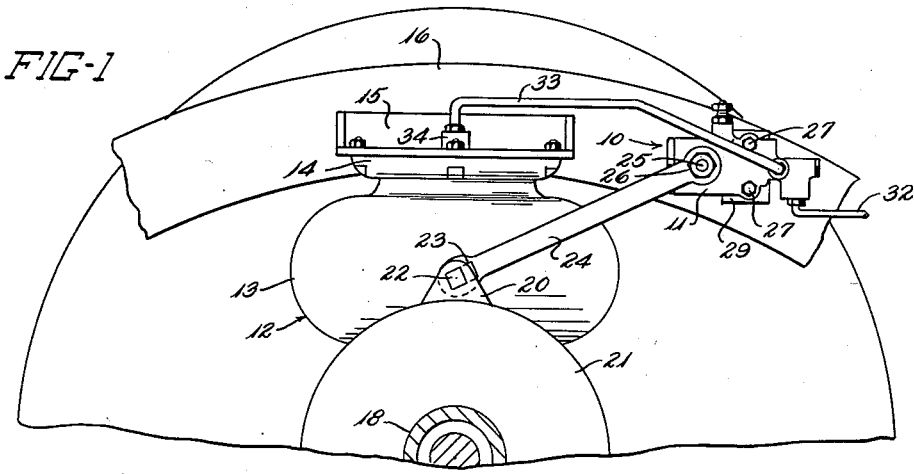
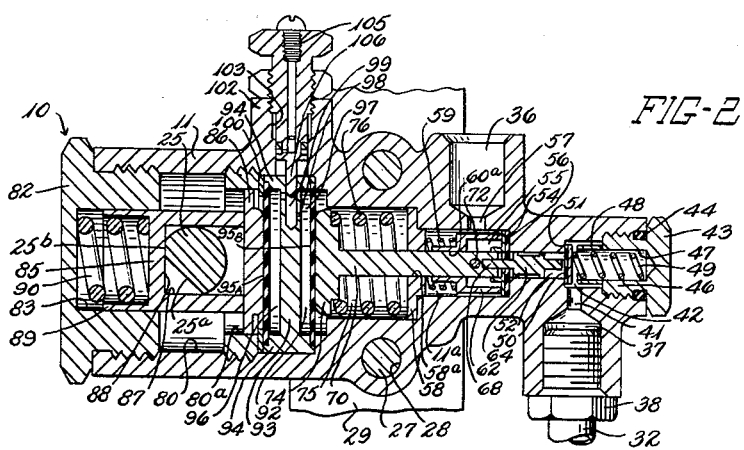
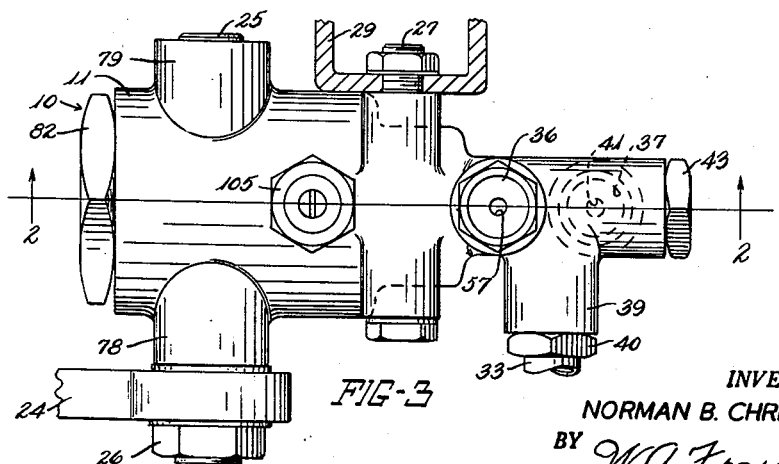
INVENTOR.
NORMAN B. CHRISTENSEN
BY W. A. Fraser
ATTY.

March 22, 1960  N. B. CHRISTENSEN  2,929,407
CONTROL DEVICE FOR VEHICLE SUSPENSION
Filed Feb. 13, 1956  2 Sheets-Sheet 2
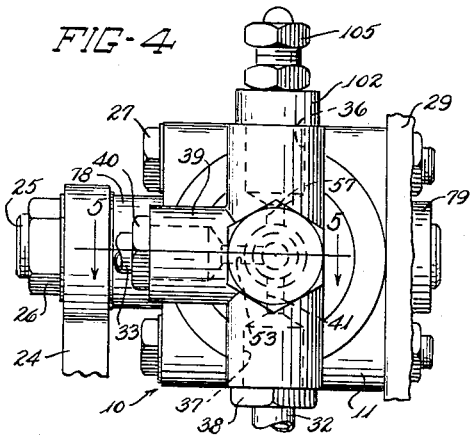
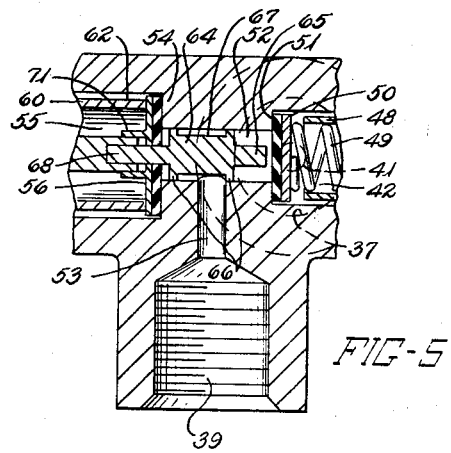
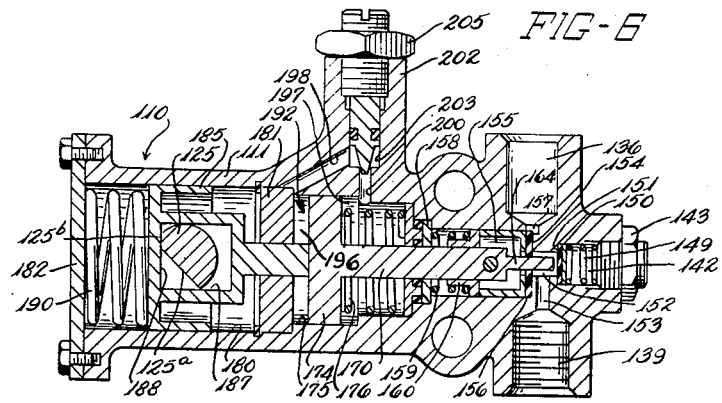
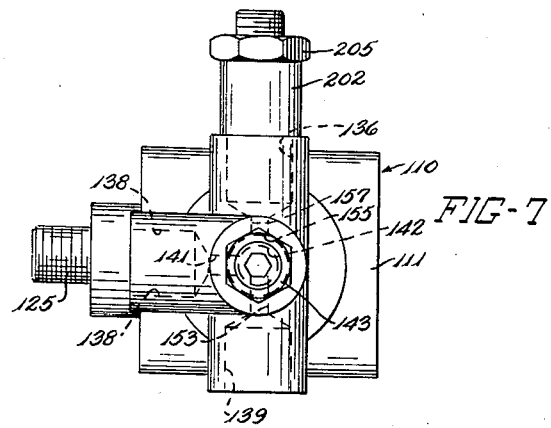
INVENTOR.
NORMAN B. CHRISTENSEN
BY *W. A. Fraser*
ATTY-

United States Patent Office 2,929,407
Patented Mar. 22, 1960

2,929,407

CONTROL DEVICE FOR VEHICLE SUSPENSION

Norman B. Christensen, North Olmsted, Ohio

Application February 13, 1956, Serial No. 565,086

5 Claims. (Cl. 137—627.5)

This invention relates generally to suspension systems for vehicles. More particularly, the invention relates to pneumatic suspension systems and provides means whereby pneumatic devices, such as bellows type air springs, may be made to respond to increased or decreased vehicle loads causing a substantial change in the riding level of the vehicle, and yet prevent unnecessary alteration of the riding level when the vehicle road gear passes over a bump or drops into a hole, which actions only momentarily alter the load on the suspension system.

Pneumatic suspension systems, incorporating air springs interposed between the vehicle frame and road or running gear, have been slow to achieve commercial success because they have not been provided with satisfactory valve means for controlling and regulating the air cushion within the air springs. Maintaining a constant average air spring length of air cushion under variable static load conditions, will provide a constant riding level for the vehicle.

A satisfactory valve means for effectively controlling the riding level of a vehicle having an air spring suspension, must be responsive to changing static load conditions. An increase in the load will compress the air spring. To restore the air spring to its initial position, air under increased pressure must be admitted into the air spring. A decrease in load will cause the air spring to extent or raise, and therefore, air must be exhausted or vented from within the air spring to restore it to its initial position.

In addition to controlling the supply and exhaust of air to and from an air spring, a satisfactory valve control means must embody therein an adjustable time delay so that momentary alteration of the static load on the suspension system, such as would be encountered during normal axle movement due to road irregularities, will not cause the valve to supply or exhaust air. This time delay feature is often referred to as "damping" and preferably is adjustable over a time range of from 1 to 20 seconds, as determined by the weight of the vehicle, road conditions, etc.

The operation of the valve means also must not be influenced by the natural frequency of the vehicle suspension system which will probably be in the range of from 1 to 2 cycles per second.

Lastly, a satisfactory valve and its control means must be unaffected by and remain operative under extremes of temperature, humidity and exposure to sand, dirt, grease, oil and water.

It is therefore an object of this invention to provide an improved pneumatic suspension system for vehicles, which system includes improved valve and valve control means for controlling and regulating air springs interposed between the vehicle frame and road gear, so as to furnish a constant riding level for the vehicles and a constant average air spring length.

Another object is to provide an improved valve and control means for control and regulation of a vehicle air spring suspension, which controls the supply and exhaust of air to the air springs, has a novel time delay or "damping" feature, and is operative under extremes of temperature, humidity and other environmental conditions.

A further object is to provide an improved valve and control means located remotely of the air springs and embodying therein a novel adjustable time delay or damping component to prevent excessive operation of the valve, which is accurately responsive to persistent changes in vehicle loading, and which is of simple, relatively uncomplex construction.

A further object is to provide a novel time delay or damping mechanism for use with an air spring control valve.

These and other objects will be apparent in view of the following detailed description of the invention considered with the attached drawings.

In the drawings:

Fig. 1 is a vertical sectional view through a vehicle axle showing in elevation a portion of the vehicle equipped with a pneumatic suspension system according to the invention;

Fig. 2 is a sectional view, taken substantially on line 2—2 of Fig. 3, and rotated 90°;

Fig. 3 is a top plan view of a valve and control means according to the invention;

Fig. 4 is an end view of the valve and control means;

Fig. 5 is an enlarged partial section, taken substantially on line 5—5 of Fig. 4, turned 90° and rotated 90°;

Fig. 6 is a view, similar to Fig. 2, showing an alternative form of the invention; and Fig. 7 is an end view of the embodiment of the invention shown in Fig. 6.

In the present invention a ride control valve means, indicated generally by the numeral 10, includes a housing 11 which carries a damping means, and an air supply and exhaust control means. The housing 11 is located remotely and laterally of a conventional air spring bellows 12, of multi-ply rubber and cord construction and having one or more convolutions 13. The upper end of the air spring is hermetically fastened by a suitable clamp ring 14 to the underside of a horizontal transverse member 15 constituting a portion of the vehicle frame. The member 15 is securely affixed at either end to longitudinal frame members 16. The lower end of the air spring 12 is also hermetically fastened to the axle housing 18 of the vehicle road gear. One mode of interposing an air spring between a vehicle frame and road gear has been shown and described. It will be understood, however, that the principles of the invention are applicable to air springs interposed in other ways between the frame and road gear. Also, only one air spring has been shown in connection with this invention, but it will be understood that the invention may be utilized with as many air springs as are required on a vehicle.

A stub flange 20 which may be located atop the vehicle differential housing 21, has a bolt 22 therethrough, which bolt extends through an elongated longitudinal slot 23 formed in the lower end of a control valve actuating rod 24, so that rod 24 is slidably mounted on bolt 22. The upper end of the actuating rod is fixed to one end of a control valve actuating shaft 25 and secured thereon by a nut 26, said shaft being mounted for rotation in housing 11 in a manner to be described. The housing 11 preferably is located above and to the rear of the horizontal plane of the axle, and is fastened by bolts 27, extending through holes 28 in the housing 11, to a bracket 29 secured to a longitudinal frame member 16.

Air, from a source under pressure (not shown), is supplied to the control device 10 by suitable piping 32 having a conventional check valve (not shown) therein so that air cannot back out. The control device is connected by suitable piping 33 to an air spring fitting 34, which extends through the frame member 15 into the interior of the air spring. The piping 33 is the conduit for supplying air to and exhausting air from the air spring 12, through the control device 10, as referred to later.

As best shown in Fig. 2, the upper portion of the housing 11 has an air exhaust port 36 which vents from the interior 11a of the housing to the atmosphere. Opposite of the exhaust port is an air supply port 37 into which a fitting 38, attached to the spring 32, is tightly secured. At right angles to the exhaust and air supply ports 36 and 37 (see Fig. 3), is a two-way bellows port 39 into which a fitting 40, attached to the piping 33, is tightly secured.

The air supply port 37 opens through a short vertical passage 41 into the inner end of an axially located air supply chamber 42. The outer end of chamber 42 is sealed by a threaded cap 43 and an O-ring 44. The inner portion 46 of the cap has an axial valve spring seat bore 47 therein. At the end of the bore 47, a spring guide sleeve 48 is attached to the cap 43. Fitted within the bore 47 and sleeve 48 is a valve spring 49 which normally seats a valve 50, in the form of a flat, reinforced, air impermeable disc, against a reduced diameter shoulder 51 forming the inner end of the chamber 42. Air, under pressure, supplied by the piping 32, is at all times free, to enter the control device 10 through the port 37. However, so long as the valve 50 is seated by the spring 49 against the shoulder 51, the compressed air cannot pass further into the interior of the housing.

Referring to Figs. 2 and 5, the shoulder 51 forming the inner end of the air supply chamber 42 also forms one end of a short axially located bellows chamber 52. The bellows port 39 communicates with the chamber 52 through a short lateral passage 53. The other end of the bellows passage is formed by a shoulder 54 and communicates with an air exhaust chamber 55. As stated above, the air supply entrance to the bellows chamber 52 is normally closed by the valve 50. The air exhaust exit from the bellows chamber is normally closed by a similar disc valve 56, having a diameter slightly less than that of the chamber 55.

Referring to Fig. 2, when the valve 56 is unseated from against the shoulder 54, air is free to pass from the bellows chamber 52 into the air exhaust chamber 55, which communicates with the exhaust port 36 through a short vertical passage 57. Opposite of the opening into the bellows chamber, the end of the exhaust chamber is sealed by a plug 58, having an axial bore 58a. The inner facing surface of the plug 58 provides a seat for a valve spring 59. The spring 59 functions similarly to the spring 49 and normally urges a valve cup 60, having an axial bore 60a and a hollow end 62, against the reinforced back surface of the valve 56.

As best shown in Fig. 5, within the bellows chamber 52 is an air supply valve actuating plunger 64 having a stem portion 65 intended for actuating the valve 50. The plunger 64 has identical end portions 66 having a diameter nearly, but not quite, identical with the I.D. of the bellows chamber. Thus, axial movement of the plunger 64 through the bellows chamber is stabilized without interference to the passage of air therethrough. Between the end portions, the medial portion 67 of the plunger has a reduced diameter to permit the free flow of air into and from the passage 53 and bellows port 39.

The end of the plunger 64 adjacent the valve 56 has a stem 68, similar to the stem 65, which is slidably fastened to the valve 56 and extends therethrough into the air exhaust chamber 55. Referring to Fig. 2, the stem 68 is rigidly inserted and held in the stem end of a valve actuating piston 70. The stem of the piston 70 is slidably held within the bores 58a of the plug and 60a of the cup, while the end into which plunger stem 68 is inserted is stablized by a cup 71 attached to the reinforced back of the valve 56. A pin 72, extending transversely through the piston 70, within the hollow end 62 of the cup 60, provides for compression of the spring 59 when the piston is moved axially to the left as viewed in Fig. 2. The head 74 of the piston 70 is movable within a piston chamber 75. A spring 76, fitted around the stem of the piston within the chamber 75 and seated between the plug 58 and the piston head 74, assists in the axial movement of the piston, as described in detail below.

Axial movement of the piston 70, and thus the opening of the valves 50 or 56, is actuated by rotation of the shaft 25. Referring to Fig. 3, the actuating shaft 25 extends through the large diameter end portion of the housing 11. The end of the shaft fastened to the actuating rod 24 is journaled in a boss 78. The other end of the shaft is journaled in a similar boss 79. Both ends of the shaft 25 are round so as to rotate freely. However, as shown in Fig. 2, within the valve housing 11, the shaft is generally semicircular in section having a flat surface 25a. One corner of the surface 25a is further relieved, at an angle of approximately 45°, to present a second flat surface 25b.

Within the large end of the housing 11 is a cylindrical horizontal bore 80 having an inner slightly reduced diameter portion 80a. The open end of the bore 80 is sealed by a threaded cap 82 having an axial inwardly facing small diameter bore 83. Located within the bore 80 is a cylindrical shaft follower member 85. The innermost portion of the member 85 is an actuating plate 86, slidably fitted in the bore 80a. Outwardly of the plate 86, the member 85 is slightly reduced in diameter and slotted as at 87 to permit the shaft 25 to extend transversely of the bore 80. The medial portion of the member 85 has a vertical surface 88 which is normally in contact with surface 25b of the actuating shaft. The end 89 of the member 85 is slidably fitted within the bore 83 and serves to seat an actuating spring 90, located within the bore 83.

Within the medial portion of the housing 11, between bore 80a and the piston chamber 75, is a preferably cylindrical damping chamber 92. Tightly fitted within the chamber 92 is a rigid center member 93, I-shaped in cross section, having identical flange portions 94. Fitted tightly to the flange portions on opposite sides of the center member are strong, yet resilient, movable diaphragms 95A and 95B, which are preferably of neoprene or other suitable material. The area between the inner face of each diaphragm and the center member 93 is filled completely with a suitable liquid such as hydraulic brake fluid. Communication between the fluid chambers 96 and 97 thus formed is provided by the small diameter orifices 98 opening into a short vertical bore 99 in the upper portion of the central member 93. Tightness of the diaphragms may be assured by the use of suitable spacer rings such as indicated at 100.

Above the damping chamber 92, laterally of the exhaust port 36, is a boss 102 having a vertical bore 103 communicating with the bore 99 in the central member 93. Fitted into the upper end of the bore 103, is an adjustable needle valve 105, having a stem portion 106 fitting into the bore 99. Movement of the needle valve and stem 106 downwardly into the bore 99 will provide reduction in the rate at which a given quantity of fluid will transfer from fluid chamber 96 to chamber 97, or vice versa. Conversely, movement of the needle valve upwardly out of the bore 99 will permit an increase in the rate of fluid flow.

Operation of the control device 10 is as follows.

Assume that the normal static load on the vehicle suspension requires that the air springs 12 be inflated to a pressure of about 50 p.s.i. At this pressure, valve 50 will be seated against shoulder 51 by spring 49, and valve 56 will be seated against shoulder 54 by spring 59.

Now then, assume that the static load is increased, for example, by adding merchandise or passengers to the vehicle. As the load is increased, the upper frame members 15 and 16 move downwardly toward the axle housing 18, causing the air spring 12 to contract. During this downward movement of the upper frame members, the bracket 29 and the control device 10 also move downwardly. Such downward movement of the control device 10, causes the actuating shaft 25 to be turned by the actuating rod 24, the lower end of which is slidably attached to the differential housing, to permit sliding movement of the rod as the device 10 moves downwardly. That is, as the distance between the member 15 and the axle housing 18 decreases, the rod 24 will cause the shaft 25 to be rotated within the valve housing 11.

As viewed in Fig. 2, an increased load will cause the shaft 25 to rotate in a clockwise direction to supply air under pressure into the air spring 12. As the shaft 25 is rotated clockwise on its axis, transverse of the bore 80, the surface 25a will be moved to a nearly vertical position. The actuating spring 90 will then urge the follower member 85 axially, to the right as viewed in Fig. 2, with the flat surface 88 maintaining contact with surface 25a.

As the spring 90 urges the shaft follower 85 axially to the right, the actuating plate will immediately contact, and being to distend toward the center member 93, the left hand diaphragm 95A. Such distension of the diaphragm 95A reduces the volume of the fluid chamber 96 and causes the fluid therein to move through orifices 98 and bore 99 into the fluid chamber 97. The rate of such movement is controlled by adjustment of the needle valve 105.

As the fluid moves into the fluid chamber 97, the diaphragm 95B is distended to the right, away from the central member 93, into contact with the piston head 74. As more fluid is moved into the fluid chamber 97, the piston 70 will thus move to the right. Such movement causes the plunger 64 to move to the right and the plunger stem 65 will move the valve 50 from its seat against shoulder 51, permitting additional air to pass from the supply port 37, through the bellows passage 52, to the port 39, and then to the air spring 12. This additional air must be under a greater pressure than the air already in the spring 12, and will extend the air spring to its initial position.

As the air spring extends, the upper frame members 15 and 16 move upwardly from the axle housing 18, causing the actuating shaft 25 to be turned by the actuating rod 24 in a counter-clockwise direction as viewed in Fig. 2. As the shaft 25 begins to assume the normal position shown in Fig. 2, the surface 25b, in contact with surface 88, will restore the follower member 85 to its original position. This removes the pressure of the actuating plate 86 on the diaphragm 95A which is free to recover its normal position. With the pressure on diaphragm 95A released, the piston spring 76 which had been compressed by the movement of the piston to the right, will be free to move the diaphragm 95B which had been distended to its original position. The piston 70, plunger 64 and plunger stem 65 will move to the left, permitting valve spring 49 to close the valve 50 and shut off the flow of additional air to the air spring.

If the static load on the vehicle suspension is decreased, the frame members 15 and 16 move upwardly away from the axle housing 18, causing the air spring 12 to extend. During this upward movement of the upper frame members, the control device 10 also moves upwardly. Such upward movement of the control device 10 causes the actuating shaft 25 to be rotated by the actuating rod 24, in the counter-clockwise direction as viewed in Fig. 2, said rod sliding with respect to the bolt 23 as the device 10 moves upwardly.

As the shaft 25 is rotated counter-clockwise on its axis, the rounded portion of the shaft 25 will displace surface 88 of the shaft follower 85 to the left, compressing further the actuating spring 90. This movement also moves the actuating plate 86 to the left and the diaphragm 95A is free to distend away from the center member 93. The piston spring 76 will then cause the piston head 74 to distend the diaphragm 95B toward the center member 93. This reduces the fluid volume of chamber 97 which results in fluid being transferred, through the orifices 98 and bore 99, into fluid chamber 96.

As the piston 70 moves to the left, pin 72 will unseat the valve cup 60 from against the valve 56, and the plunger 64 will move valve 56 from its seat against shoulder 54. This permits air to exhaust from the air spring 12, through the bellows chamber 52, around the valve 56 and through the exhaust chamber 55, through the exhaust port 36, to the atmosphere. The exhaust of air from within the spring 12 will contract the air spring to its original position.

As the air spring contracts, the upper frame members 15 and 16 move downwardly toward the axle housing 18 causing the actuating shaft to be rotated by the actuating rod 24 in a clockwise direction as viewed in Fig. 2. The shaft 25 will then present surface 25b to the surface 88, permitting the actuating spring 90 to urge the follower member 85 and actuating plate 86 against the distended diaphragm 95A. The pressure on diaphragm 95A causes the flow of hydraulic fluid to be reversed in direction, diaphragm 95B being distended away from the center member 93 to its original position with all components of the device 10 being returned to the position shown in Fig. 2.

When a vehicle equipped with a suspension system according to the invention is driven over rough roads with no change in the static loading, the vehicle wheels will move up and down over bumps and into holes in the road. This causes the actuating shaft to be quickly rotated in either direction as the case may be. However, a quick rotation of the shaft 25 will not cause the various components of the control device 10 to react to supply or exhaust air because of the damping or time delay effect of the fluid filled chambers 96 and 97 upon movement of the piston 70 and plunger 64. Thus, the admission of additional air to or exhaust of air from the air spring 12 will not occur until a force is maintained in one direction for a predetermined period of time which can be controlled by the needle valve 105 in the bore 99. After the several springs in the device are balanced, it will be found desirable to choose a needle valve 105 which will provide a time lag of about 7 seconds before the diaphragms 95A and 95B will move from the normal or middle position shown in Fig. 2. However, the time delay may be selected any place within the preferred range of from 1 to 20 seconds.

An alternative embodiment of the invention, similar in most respects to control device 10, is indicated generally by the numeral 110 in Figs. 6 and 7. The housing 111 has an exhaust port 136, a supply port 138 and a bellows port 139. The supply port 138 connects via passage 141 with an air supply chamber 142. Chamber 142 is sealed by a cap 143 and a spring 149 seats a valve 150 against a shoulder 151. The bellows port 139 connects via passage 153 with a bellows chamber 152. A valve 156, seated against a shoulder 154, closes off an exhaust chamber 155 from the bellows chamber 152. The other end of chamber 155 is closed by a plug 158. The exhaust port 136 connects via passage 157 with the exhaust chamber. The valve 156 is seated by a spring 159 and a valve cup 160.

The valves 150 and 156 are actuated by a plunger 164, which is attached to and actuated by movement of a piston stem 170. The piston has a head 174 movable within a piston chamber 175 and a spring 176 is seated around the stem between the head 174 and plug 158.

The actuating shaft 125 extends through the large diameter end of the housing 111 and transversely of a bore 180, closed at its inner end by a plug 181 and at its outer end by a cap 182. A shaft follower member 185 slotted as at 187 so that the shaft 125 will pass therethrough and having a flat surface 188 in contact with the shaft is located within the bore 180. An actuating spring 190 urges the surface 188 into contact with the shaft.

Between the bore 180 and the piston chamber 175 is a damping chamber 192. The piston head 174 is slidable within this chamber. The flow of hydraulic fluid is from the right hand side 197 of chamber 192 through a vertical bore 200 into a larger vertical bore 203 and then through a diagonal bore 198 into the left hand side 196 of chamber 192, or vice versa. The rate of flow is controlled by a needle valve 205, adjustable in a boss 202.

The operation of the control device 110 is also similar to that of the control device 10. That is, rotation of shaft 125 will open either valve 150 or valve 156 to supply air under pressure to the air spring or to exahust air from the air spring.

A shut off valve (not shown) can be provided in the air spring line 33 so that an operator can shut off the line when raising the vehicle by a bumper jack to remove a tire.

While a preferred embodiment of the invention has been shown it will be apparent that changes and modifictaions, other than those specifically noted herein, could be made without departing from the basic principles of the invention. Therefore, the annexed claims are intended to embody therein changes of such nature.

What is claimed is:

1. A control device for a vehicle pneumatic suspension system, said system including an expansible bellows containing a cushion of air under pressure interposed between the road gear and frame of said vehicle, comprising, a housing, one end of said housing having an air supply port, an air exhaust port, and a bellows port, the opposite end of said housing having walls defining a horizontal bore at right angles to each of said ports, a first valve for blocking passage of air interiorly of said housing between said supply port and bellows port, a second valve for blocking passage of air interiorly of said housing between said exhaust port and bellows port, a plunger movable between said valves on the same axis as the axis of said bore, a piston extending axially of said plunger toward said bore, a shaft extending transversely of said bore and exteriorly of said housing, a shaft follower member slidable in said bore, a compressed actuating spring in said bore urging said follower member into contact with said shaft, and a hydraulic means interposed between the shaft follower member and said piston, said hydraulic means being responsive to rotation of said shaft so as to cause said piston to actuate said plunger and selectively open one of said valves.

2. A control device for a vehicle pneumatic suspension system, said system including an expansible bellows containing a cushion of air under pressure interposed between the road gear and frame of said vehicle, comprising, a housing, one end of said housing having an air supply port, an air exhaust port, and a bellows port, the opposite end of said housing having walls defining a horizontal bore at right angles to each of said ports, a first valve for blocking passage of air interiorly of said housing between said supply port and bellows port, a second valve for blocking passage of air interiorly of said housing between said exhaust port and bellows port, a plunger movable between said valves on the same axis as the axis of said bore, a piston extending axially of said plunger toward said bore, a shaft extending transversely of said bore and exteriorly of said housing, a shaft follower member slidable in said bore, a compressed actuating spring in said bore urging said follower member into contact with said shaft, a rigid member within said bore between said follower member and said piston, flexible diaphragms secured to either side of said rigid member to form two variable volume chambers, one of said diaphragms being in contact with said follower member and the other of said diaphragms being in contact with said piston, said chambers being completely filled with hydraulic fluid, small diameter orifices through said rigid member connecting said chambers, and means cooperating with said orifices to regulate passage of fluid between said chambers when the shaft is rotated.

3. A control device for a vehicle pneumatic suspension system, said system including an expansible bellows containing a cushion of air under pressure interposed between the road gear and frame of said vehicle, comprising, a housing, one end of said housing having an air supply port, an air exhaust port, and a bellows port, the opposite end of said housing having walls defining a horizontal bore at right angles to each of said ports, a first valve for blocking passage of air interiorly of said housing between said supply port and bellows port, a second valve for blocking passage of air interiorly of said housing between said exhaust port and bellows port, a plunger movable between said valves on the same axis as the axis of said bore, a piston extending axially of said plunger toward said bore, a spring opposing movement of said piston to actuate said plunger, a shaft extending transversely of said bore and exteriorly of said housing, a shaft follower member slidable in said bore, a compressed actuating spring in said bore urging said follower member into contact with said shaft, a rigid member within said bore between said follower member and said spiston, flexible diaphragms secured to either side of said rigid member to form two variable volume chambers, one of said diaphragms being in contact with said follower member and the other of said diaphragms being in contact with said piston, said chambers being completely filled with hydraulic fluid, small diameter orifices through said rigid member connecting said chambers, and means cooperating with said orifices to regulate passage of fluid between said chambers when the shaft is rotated.

4. A control device for a vehicle pneumatic suspension system, said system including an expansible bellows containing a cushion of air under pressure interposed between the road gear and frame of said vehicle, comprising, a housing, one end of said housing having an air supply port, an air exhaust port, and a bellows port, the opposite end of said housing having walls defining a horizontal bore at right angles to each of said ports, a first valve for blocking passage of air interiorly of said housing between said supply port and bellows port, a second valve for blocking passage of air interiorly of said housing between said exhaust port and bellows port, a plunger movable, between said valves on the same axis as the axis of said bore, a piston extending axially of said plunger toward said bore, said piston having a head and being movable to actuate said plunger, a shaft extending transversely of said bore and exteriorly of said housing, a shaft follower member slidable in said bore, a compressed actuating spring in said bore urging said follower member into contact with said shaft, a first rigid member within said bore between said follower member and said piston, a second rigid member, with the piston extending movably therethrough, at the end of said bore between said piston head and said second valve, the area of said bore between said first rigid member and said piston defining a first variable volume chamber, the area of said bore between said piston head and said second rigid member defining a second variable volume chamber, said chambers being completely filled with hydraulic fluid, small diameter orifices through said housing radially of said bore connecting said chambers, and means cooperating with said orifices to regulate passage of fluid between said chambers when the shaft is rotated.

5. A control device for a vehicle pneumatic suspension system, said system including an expansible bellows containing a cushion of air under pressure interposed between the road gear and frame of said vehicle, comprising, a housing, one end of said housing having an air supply port, an air exhaust port, and a bellows port, the opposite end of said housing having walls defining a horizontal bore at right angles to each of said ports, a first valve for blocking passage of air interiorly of said housing between said supply port and bellows port, a second valve for blocking passage of air interiorly of said housing between said exhaust port and bellows port, a plunger movable between said valves on the same axis as the axis of said bore, a piston extending axially of said plunger toward said bore, said piston having a head and being movable to actuate said plunger, a spring opposing movement of said piston to actuate said plunger, a shaft extending transversely of said bore and exteriorly of said housing, a shaft follower member slidable in said bore, a compressed actuating spring in said bore urging said follower member into contact with said shaft, a first rigid member within said bore between said follower member and said piston, a second rigid member, with the piston extending movably therethrough, at the end of said bore between said piston head and said second valve, the area of said bore between said first rigid member and said piston defining a first variable volume chamber, the area of said bore between said piston head and said second rigid member defining a second variable volume chamber, said chambers being completely filled with hydraulic fluid, small diameter orifices through said housing radially of said bore connecting said chambers, and means cooperating with said orifices to regulate passage of fluid between said chambers when the shaft is rotated.

References Cited in the file of this patent
UNITED STATES PATENTS

| | | |
|---|---|---|
| 669,274 | Ward | Mar. 5, 1901 |
| 1,234,949 | Stack | July 31, 1917 |
| 1,805,802 | Browne | May 19, 1931 |
| 2,075,600 | Baker | Mar. 30, 1937 |
| 2,593,906 | Markson | Apr. 22, 1952 |
| 2,670,201 | Rossman | Feb. 23, 1954 |
| 2,711,757 | Gardner | June 28, 1955 |
| 2,839,264 | Trubert | June 17, 1958 |